350-96.14 SR
5/27/86 XR 4,592,004

United States Patent [19]

Bocker et al.

[11] Patent Number: 4,592,004

[45] Date of Patent: May 27, 1986

[54] ELECTROOPTICAL MATRIX MULTIPLICATION USING THE TWOS COMPLEMENT ARITHMETIC FOR IMPROVED ACCURACY

[75] Inventors: Richard P. Bocker; Stanley R. Clayton; Keith Bromley, all of San Diego, Calif.

[73] Assignee: The United States of America as represented by the Secretary of the Navy, Washington, D.C.

[21] Appl. No.: 612,288

[22] Filed: May 21, 1984

[51] Int. Cl.[4] .......................... G06F 7/56; G06G 9/00

[52] U.S. Cl. .................................... 364/713; 364/606; 364/754; 364/841; 364/845; 350/96.14

[58] Field of Search ............... 364/800, 807, 841, 845, 364/703, 713, 754–757, 759–760, 606; 350/96.14, 320–321

[56] References Cited

U.S. PATENT DOCUMENTS

| | | | |
|---|---|---|---|
| 3,305,669 | 2/1967 | Fan | 364/845 X |
| 3,588,486 | 6/1971 | Rosen | 364/845 X |
| 3,866,030 | 2/1975 | Baugh et al. | 364/757 X |
| 4,086,657 | 4/1978 | Gaskill, Jr. et al. | 364/757 |
| 4,156,284 | 5/1979 | Engeler | 364/841 X |
| 4,386,414 | 5/1983 | Case | 364/713 X |
| 4,507,749 | 3/1985 | Ohhashi | 364/757 |

OTHER PUBLICATIONS

R. A. Athale, W. C. Collins and P. D. Stilwell "High Accuracy Matrix Multiplication with Outer Product Optical Processor" *Applied Optics* (1983), vol. 22, No. 3, pp. 368–370.

R. A. Athale, W. C. Collins and P. D. Stillwell "Improved Accuracy for an Optical Iterative Processor" and *Proceedings of the Society of Photo-Optic Instrumentation Engineers* 352 (1983), pp. 59–66.

R. A. Athale and W. C. Collins "Optical Matrix-Matrix Multiplier Based on Outer Product Decomposition" *Applied Optics* (1982), vol. 21, No. 12, pp. 2089–2090.

A. Tarasevich, N. Zepkin and W. T. Rhodes "Matrix Vector Multiplier with Time-Varying Single Dimensional Spatial Light Modulators," Optical Information Processing for Aerospace Applications, *NASA Conference Publication* 2207 (NTIS, Springfield, Va., 1981), pp. 61–70.

R. P. Bocker, H. J. Caulfield and K. Bromley "Rapid Unbiased Bipolar Incoherent Calculator Cube" *Applied Optics* (1983), vol. 22, No. 6, pp. 804–807.

H. J. Whitehouse and J. M. Speiser in their article entitled "Linear Signal Processing Architectures" *Aspects of Signal Processing Part II* G Tacconni(ed.) 669–702 D. Reidel Publishing Co., Dordrecht, Holland (1977), pp. 669–702.

R. P. Bocker, S. R. Clayton, and K. Bromley, "Electrooptical Matrix Multiplication Using the Twos Complement Arithmetic for Improved Accuracy", *Applied Optics*, vol. 22, (1983), No. 13, pp. 2019–2021.

*Primary Examiner*—Gary V. Harkcom
*Attorney, Agent, or Firm*—R. F. Beers; E. F. Johnston; T. G. Keough

[57] ABSTRACT

The improved electrooptic signal processing relies upon matrix-matrix multiplication using twos complement arithmetic. A source of pulse collimated light illuminates two two-dimension spatial light modulators that operate in a reflective mode through a polarizing beamsplitter. Each of the spatial light modulators has a matrix of optically encoded information of numbers in the twos complement binary representation so that a mixed binary representation of signals is generated within the two-dimensioned photodetector array. The mixed binary representation signals are decoded to a twos complement binary representation or a decimal representation to be useful for more conventional processing techniques. The twos complement arithmetic when incorporated with the electrooptic architecture provides for a convenient means for handling bipolar numbers, avoids the need for matrix partitioning when the matrices are real and offers a means to improve accuracy over conventional optical analog techniques.

5 Claims, 9 Drawing Figures

| INTEGER | SIGNED ABSOLUTE VALUE | ONES COMPLEMENT | TWOS COMPLEMENT |
|---|---|---|---|
| 7 | 0111 | 0111 | 0111 |
| 6 | 0110 | 0110 | 0110 |
| 5 | 0101 | 0101 | 0101 |
| 4 | 0100 | 0100 | 0100 |
| 3 | 0011 | 0011 | 0011 |
| 2 | 0010 | 0010 | 0010 |
| 1 | 0001 | 0001 | 0001 |
| 0 | 0000 | 0000 | 0000 |
| -0 | 1000 | 1111 | — |
| -1 | 1001 | 1110 | 1111 |
| -2 | 1010 | 1101 | 1110 |
| -3 | 1011 | 1100 | 1101 |
| -4 | 1100 | 1011 | 1100 |
| -5 | 1101 | 1010 | 1011 |
| -6 | 1110 | 1001 | 1010 |
| -7 | 1111 | 1000 | 1001 |

$$\begin{pmatrix} -2.00 & +3.50 & -0.50 \\ +0.50 & +1.50 & +1.00 \\ -1.50 & +2.00 & +0.00 \end{pmatrix} \begin{pmatrix} +2.00 & -2.50 & +0.50 \\ +1.50 & -0.50 & -1.00 \\ -1.00 & +0.00 & -2.50 \end{pmatrix} = \begin{pmatrix} +1.75 & +3.25 & -3.25 \\ +2.25 & -2.00 & -3.75 \\ +0.00 & +2.75 & -2.75 \end{pmatrix}.$$

ELECTROOPTICAL MATRIX MULTIPLICATION USING THE TWOS COMPLEMENT ARITHMETIC FOR IMPROVED ACCURACY

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This is related to a copending application entitled "Matrix-Matrix Multiplication Using an Electrooptical Systolic/Engagement Array Processing Architecture", U.S. Patent and Trademark Ser. No. 581,168 filed Feb. 17, 1984.

BACKGROUND OF THE INVENTION

Until recently, all optical processing architectures described for performing either matrix-vector or matrix-matrix multiplication have been limited to accuracies typically in the 8–10 bit range. This accuracy limitation is largely attributed to the fact that matrix and vector element information has been encoded using conventional analog representations.

Despite the conventional approaches attempts are being made to increase the accuracy of optical processors by using either residue or binary arithmetic representations. Two approaches were advocated by R. A. Athale, W. C. Collins and P. D. Stilwell and appear in technical articles. The articles entitled "High Accuracy Matrix Multiplication With Outer Product Processor" and "Improved Accuracy for an Optical Iterative Processor" *Applied Optics* 22, 368(1983) and *Proceedings of the Society of Photo-Optic Instrumentation Engineers* 352 (1983), respectively, are based on the emergence of performing matrix-matrix multiplication using outer products and a technique for multiplying two numbers in binary form via convolution (the outer product approach is more thoroughly defined in an article by R. A. Athale and W. C. Collins in "Optical Matrix-Matrix Multiplier Based on Outer Product Decomposition" *Applied Optics* 21, 2089 (1982). The outer product between two vectors is performed using optical techniques by crossing two linear-array light modulators in the manner as described by A. Tarasevich, N. Zepkin and W. T. Rhodes in their article "Matrix Vector Multiplier with Time-Varying Single Dimensional Spatial Light Modulators," Optical Information Processing for Aerospace Applications, *NASA Conference Publication* 2207 (NTIS, Springfield, Va., 1981).

The binary multiplication via convolution technique was first suggested by H. J. Whitehouse and J. M. Speiser in "Aspects of Signal Processing with Emphasis on Underwater Acoustics", G. Tacconi, Ed. (Reidel, Dordrecht, 1977), Part 2. The same technique was later described by D. Psaltis, D. Casasent, D. Neft, and M. Carlotto in their presentation in *Proceedings of the Society of Photo-Optic Instrumentation Engineers* 232 151 (1980). Psaltis and his colleagues gave the binary multiplication via convolution technique an optical implementation point of view.

This convolutional technique is novel in that binary numbers may be added without carries if the output is allowed to be represented in a mixed binary format. In a mixed binary format, like binary arithmetic, each digit is weighted by a power of 2, but unlike binary arithmetic the value of each digit can be greater than 2. It is the elimination of the need for carries that makes this technique particularly attractive in terms of optical implementation.

An explanation of why having carries as a limitation is brought out by John D. Gossling in his chapter "Addition" in *Design of Arithmetic Units for Digital Computers* Springer-Verlag New York, Inc. (1980). On page 6 et seq, under the heading "Basic Addition" Gossling shows three interconnected registers that require the addition of numbers. The $X_1Y_1$ operation may have a carry that first must be determined before there is addition to the next register; then the next register for $X_2Y_2$ must determine if it has a carry before operation of the adjacent register $X_3Y_3$ can occur to complete the process. This time consuming sequence, common in electronic digital techniques, is a consequence of having sequential additions and the generation of carries which must occur prior in some registers before the operations can progress to other registers.

This problem of conventional electronic shift registers takes time to carry bits to adjacent registers to implement a mathematical operation. Heretofore optical processors could not follow this procedure because there simply are not equivalent structures or components for optical information processing, particularly with respect to analog signal processing. There have not been any optical shift registers for digital implementations.

Analysis and applications concerning this technique have been limited primarily to matrices with real-positive elements only. An exception to this statement was demonstrated by Collins, Athale and Stillwell in their second article identified above and called for a method for handling complex matrix elements by partitioning the complex numbers into four parts. These four parts were, positive and negative real and positive and negative imaginary. Matrix-vector or matrix-matrix products would then consist of sixteen subproducts which each could be executed sequentially and combined externally.

Thus there is a continuing need in the state-of-the-art for electrooptical processing for a matrix-matrix multiplier using twos complement arithmetic that provides a means for handling bipolar numbers, that avoids the need for matrix partitioning when the matrices are real and that offers a means to improve accuracy over conventional optical analog techniques.

SUMMARY OF THE INVENTION

The present invention is directed to providing an apparatus and method for improving accuracy in an electrooptical matrix-matrix multiplier by using twos complement arithmetic. A source of pulsed collimated light illuminates a first matrix of optical encoded information of numbers in the twos complement binary representation and a second matrix of optical encoded information of numbers in the twos complement binary representation that mutually orthogonally are displaced with respect to one another in synchronization with the pulsing of the collimated light source. A photodetector array is located to add multiplied encoded information of numbers in the twos complement binary representation of the first matrix providing means and the second matrix providing means to be expressed as mixed binary representation signals. A suitable decoder is coupled to the photodetector array for decoding the mixed binary representation signals into twos complement binary representations or digital representations for use by interconnected processing devices. Staggering the encoded twos complement binary representations of one matrix of information and orthogonally advancing it with respect to the other matrix of information allows the addition of multiplied mixed binary representations by the photodetector array to provide accurate representations of decimal mathematical numbers. These mathematical operations occur unimpeded for positive and negative numbers and have improved accuracy compared to conventional optical analog techniques.

A prime object of this invention is to provide for an improved digital matrix-matrix multiplication.

Another object is to provide an improved matrix-matrix multiplication using an optical engagement array.

Still another object of the invention is the use of twos complement binary representation in performing matrix-matrix multiplication using an optical engagement array.

Still another object of the invention is to provide for twos complement binary representations of positive and negative real numbers for providing a mixed binary representation having a degree of accuracy exceeding conventional optical analog techniques.

Still another object is to provide for an improved electrooptical matrix multiplication and the addition thereof offering a convenient means for handling bipolar numbers by using twos complement arithmetic.

Yet another object is to provide an electrooptical matrix multiplication using twos complement arithmetic that avoids the need for matrix partitioning when the matrices are real.

Still another object of the invention is to provide for an electrooptical matrix multiplication using twos complement arithmetic that avoids the time-consuming processing procedures of conventional electronic signal processing techniques.

A further object is to provide for a parallel simultaneous matrix-matrix multiplication and addition of twos complement numbers into a mixed binary representation of numbers.

These and other objects of the invention will become more readily apparent from the ensuing description and claims when taken with the drawings.

DESCRIPTION OF THE PREFERRED EMBODIMENT

Figure 1:
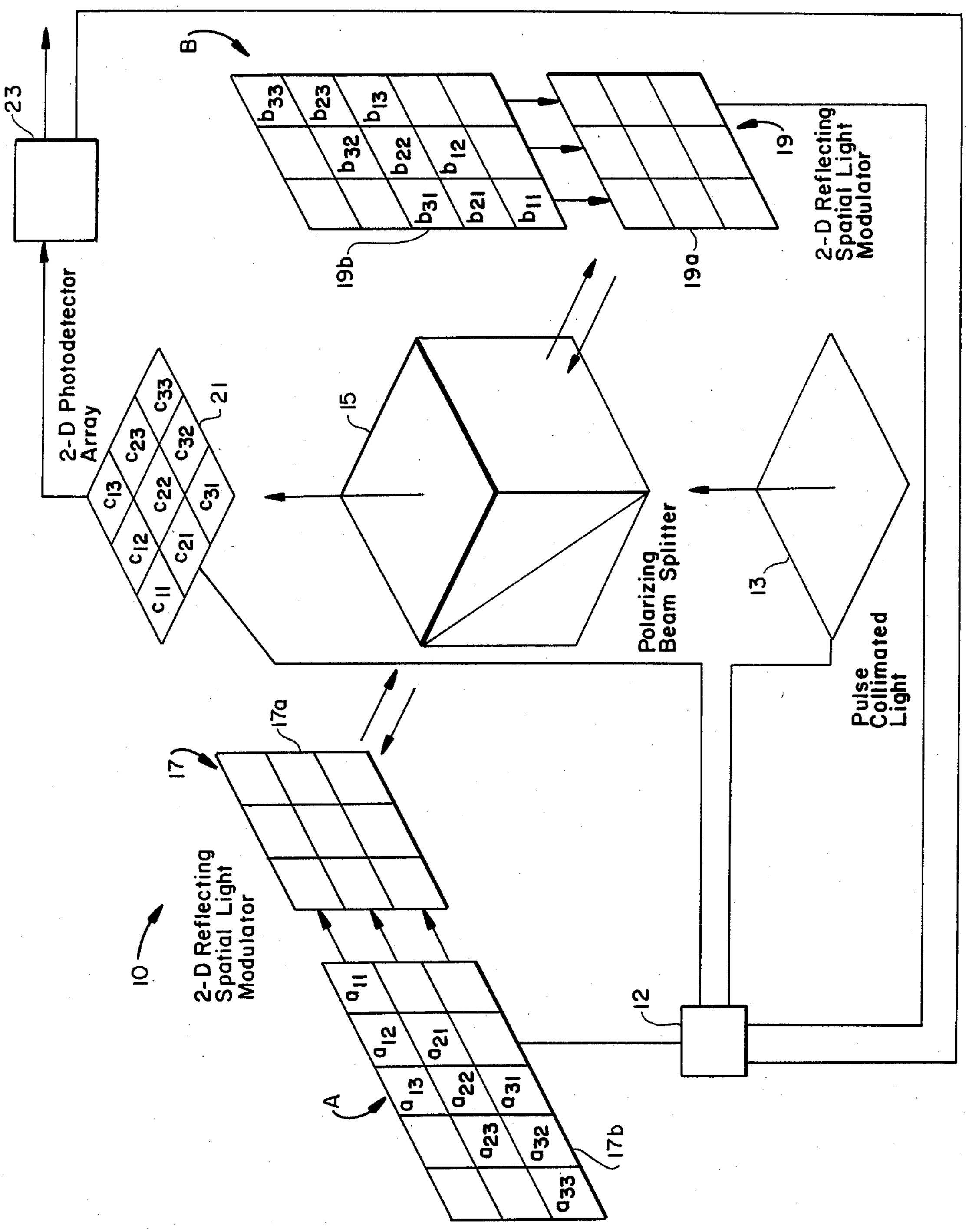
FIG. 1 depicts a representative optical engagement array architecture adaptable to using twos complement arithmetic for improved accuracy.

Referring now to FIG. 1 of the drawings a representative embodiment of a systolic engagement array processing architecture 10 is depicted in block diagram form to enable an understanding of the technique for improving the accuracy of matrix-matrix multiplications. Such an architecture has been described by R. P. Bocker, H. J. Caulfield and K. Bromley in two articles entitled "Rapid Unbiased Bipolar Incoherent Calculator Cube" appearing respectively in *Applied Optics* 22, 804 (1983) and *Proceedings of the Society of Photo-Optic Instrumention Engineers* 388, (1983) as well as in the above referenced copending patent application. This architecture incorporates modifications that enable twos complement arithmetic as described by D. E. Johnson, J. L. Hilburn and P. M. Julich in *Digital Circuits and Microcomputers* (Prentiss-Hall, Englewood Cliffs, N.J., 1979), pages 216–220.

An electronic switching circuit 12 initiates the pulsing of a pulsed collimated light source 13 to direct its pulsed beam to a polarizing beam splitter 15. The pulsed light source is one of many available noncoherent light sources and the polarizing beamsplitter is a single polarizing beamsplitter also selected from any one of a variety of commercially available devices.

The beamsplitter first directs the pulsed signals to a two-dimensional reflecting spatial light modulator 17 that has a reflective surface 17*a* backing a laterally displaceable mask 17*b* that is encoded with matrix A information. The pulsed collimated light reflected from surface reflective 17*a* goes back through the polarizing beamsplitter and onto a second 2-D reflecting spatial light modulator 19 which also has a reflective surface 19*a* and a laterally displaceable mask 19*b* encoded with matrix B information. It is to be noted that the relative excursions of the masks containing the A and B information travel are in directions orthogonal to one another, the purpose of which will be explained below. Pulsed light reflected from reflective surface 19*a* once again enters polarizing beamsplitter 15 where it is directed onto a two-dimensional photodetector array 21. An electrically interconnected demodulator 23 receives signals representative of a mixed binary representation and decodes them to twos complement or decimal form in a manner and for the purposes to follow.

Each of the two-dimension spatial light modulators that in this case operate in a reflective mode could be a pair of CCD spatial light modulators using the electro absorption (FRANZ-KELDYSH) effect in GaAs as disclosed by R. H. Kingston, B. E Burke, K. B. Nichols, and F. J. Leonberger in "Spatial Light Modulation Using Electroabsorption in a GaAs Charge-Coupled Device" *Applied Physics Letters* 41 413(1982). 2-D CCD spatial light modulators appear particularly attractive since they are potentially capable of being clocked at rates in excess of 1 GHz. Optionally both the spatial light modulators could be planar surfaces having a film or other suitably configured mask appropriately provided with holes and blank spots to provide a binary 1 and 0 encoding. Suitably arranged parallel strips of acousto driven BRAGG cells can be adapted to function as the mask material. They have the capability of being rapidly shifted and changed to provide the necessary patterns to indicate binary representations of matrix numbers. The pulsed collimated light source can assume the form of a light-emitting diode or a laser diode. The photodetector array can be simply an array of photodiodes or even a photo activated two-dimensional charge coupled device.

Electronic switching circuit 12 initiates the pulsing of source 13 and simultaneously advances modulator 17 and 19 one matrix element. The advance of the modulators is orthogonal and overlapping with respect to one another.

The simultaneous pulsing of the light source with the alignment of elements of matrix A and B effects a multiplication of the information encoded thereon. The light responsive cells of the aligned photodetector array will receive the multiplied pulses and accumulated or add sequentially pulse-multiplied products of matrix A and B encoded numbers until the matrix multiplication is complete. Then the switching circuit will initiate a readout to decoder 23 and the reconversion of mixed binary numbers into a twos complement or decimal representation form. The engagement-array architecture portrayed in FIG. 1 is an offshoot of the systolic array architecture pioneered by H. T. Kung in "Special-Purpose Devices for Signal and Image Processing: An Opportunity in very Large Scale Integration (VLSI)" *Proceedings of the Society of Photo-Optic Instrumentation Engineers* 241, 76(1980). This has led to a standardization, for example see the aricle by J. M. Speiser and H. J. Whitehouse "Parallel Processing Algorithms and Architectures for Real-Time Signal Processing" *Proc. SPIE* 298, 2(1981), to symbolize the multiplication of two matrices using the architecture shown in FIG. 3. This symbolism is reminiscent of the manner in which the information associated with the input matrices A and B is loaded into the spatial light modulators and the format in which the matrix C information is generated within the photodetector array.

The twos complement binary representation allows for the handling of both positive and negative numbers, with sign bits included and, thus, eliminates the need for matrix partitioning when the matrices of interest are real. Looking now to FIG. 2 a brief explanation of the twos complement arithmetic will provide a basis for a greater understanding of this inventive concept. In this FIG. a comparison is made of the binary representations of signed absolute values, the ones complement representation and the twos complement binary representation for integers between +7 and −7. These representations are discussed in detail in an article by D. M. Young and R. T. Gregory in *A Survey of Numerical Mathematics* Vol. 1, pages 28–34 Addison-Wesley, Reading, Mass.(1972).

The leftmost bits in all three columns, the signed absolute, the ones complement and the twos complement is the sign bit with 0 indicating a plus integer and one for a minus integer. Three binary representations for positive numbers are identical in thesigned, ones complement and twos complement representations. The signed absolute value representation for a negative number is obtained by changing the sign bit from a 0 to a 1 in the signed absolute value representation of the corresponding positive number. The ones complement representation of a negative number is obtained by changing all ones to zeros and all zeros to ones in the ones complement representation of the corresponding positive number. The twos complement representation of a negative number is obtained by adding 1 to the least significant bit to the corresponding ones complement representation of the same negative number. The twos complement representation of −0 is not defined.

The concepts involved are clarified by way of an example. First, consider the multiplication of two decimal numbers, say +13.375 by −3.25. The decimal product without truncation or rounding is −43.46875. The twos complement binary representation of each of these three numbers including sign bits, is as follows:

| Decimal representation | Twos complement representation |
|---|---|
| +13.375 | 01101.011 |
| −3.25 | 100.11 |
| −43.46875 | 1010100.10001 |

Note that these are the minimum number of bits required to completely represent these numbers without truncation or rounding. For each of the twos complement numbers above, the bit farthest to the left is the sign bit, 0 for plus and 1 for minus. When real positive numbers are being dealt with exclusively 100.11 would stand for 4.75 but the left-most bit is a sign bit hence 100.11 represents −3.25 in the twos complement representation. Similarly the number 01101.011 is not the same as 1101.011 because of the twos complement convention so that the leading zero is necessary. The bit adjacent to the sign bit is the most significant bit whereas the bit furthest to the right is the least significant bit.

One technique for multiplying two numbers using the twos complement binary representation, which is well suited for electrooptical implementation as set out above, requires that the input numbers be represented by the same number of bits required to represent the output. For the example at hand, the output requires a total of twelve bits, including the sign bit. Therefore the two input numbers must also be represented by twelve bits as follows:

| Decimal representation | Twos complement representation |
|---|---|
| +13.375 | 000001101.011 |
| −3.35 | 1111111100.11 |

Four zeros were inserted between the sign bit and the most significant bit of the twos complement representation for +13.375, and seven ones were inserted between the sign bit and the most significant bit of the representation for −3.25 to obtain the required 12-bit representations. It is noted that the four zeros or seven ones are duplicates of the sign bits to fill the twelve spaces. The sign bit determines whether or not zeros or ones are to be used as filler for the 12-bit representation.

Figure 4:
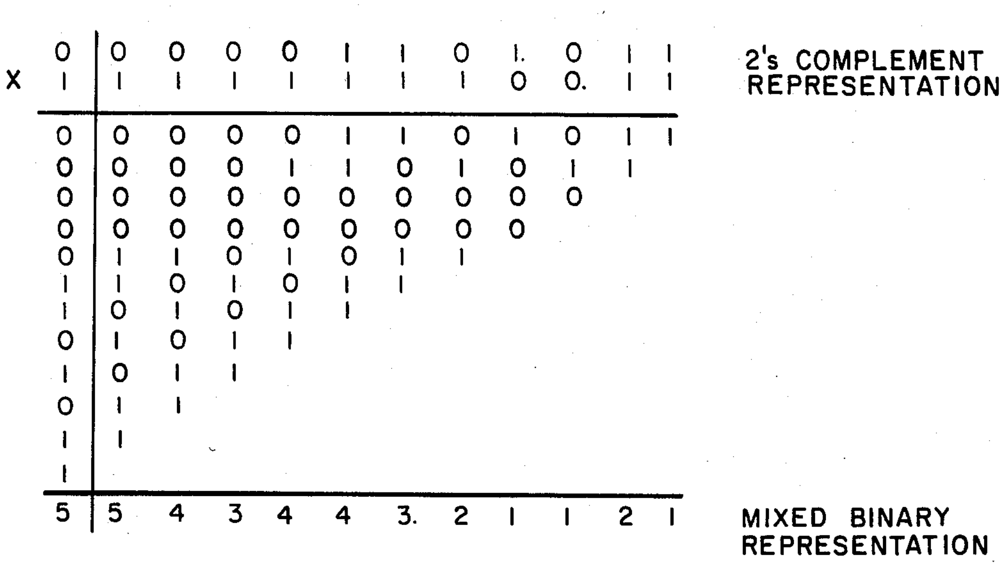
FIG. 4 depicts the multiplication of two numbers in twos complement representation whose product is expressed in a mixed binary representation.

The 12-bit representations are used to perform the binary multiplication as generally depicted in FIG. 4.

This multiplication is performed in the usual sense except that any bits generated to the left of the sign column are simply truncated with little, if any, information loss. The resulting answer is expressed in a mixed binary representation. Each digit making up the answer corredponds to the number of ones in that column. *No carries* are performed in the addition process making it highly suitable for electrooptical processing applications.

Figure 5:
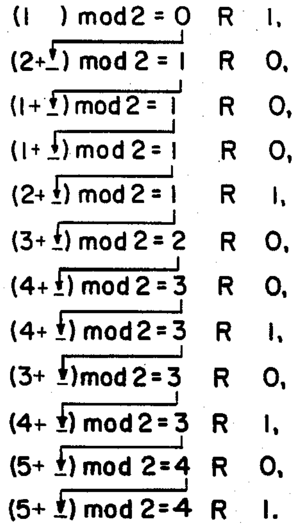
FIG. 5 shows a representation of the conversion from a mixed binary representation back to a twos complement representation that occurs in the decoder.

The mixed binary representation 5543443.21121 easily can be converted to the twos complement representation by the procedure schematically shown in FIG. 5 and is carried on in the decoder 23 of FIG. 1. The signals of the mixed binary representation are added products of the matrix-matrix multiplication. The signals are multilevel and represent accumulated amounts in the cells of the photodetector array 21.

The procedure of FIG. 5 can be expressed as a modulo mathematical operation that yields a remainder function of division. It is shown in FIG. 5 as being the mixed binary representation divided by 2 or in other words (binary number representation) modulo 2=R. The one or zero remainder is the interger of interest for the conversion of the mixed binary representation to a twos complement number.

The mixed binary number is written with the least significant number at the top down to the most significant number. The least significant digit 1 mod 2=0 with a remainder R=1. Since the least significant digit could not be divided by 2, there was no carry to the next mixed binary number (2). The next number 2 mod 2=1 with a remainder 0.

This mathematical procedure continues on for the rest of the mixed binary number. The series of remainders R represents the desired twos complement binary representation of the decimal product, i.e. twos complement 1010100.10001=−43.46875.

The procedure as represented in FIG. 5 can be carried out by electronic circuitry designed in with the analysis and processing architectures of H. J. Whitehouse and J. M. Speiser in their article entitled "Linear Signal Processing Architectures" *Aspects of Signal Processing Part* II G Tacconni(ed.) 669-702 D. Reidel Publishing Co., Dordrecht, Holland (1977). Fabrication of an appropriate circuit shown on pp 699 that includes suitable A/D and Shift and Add registers is well within the scope of an electronic technician and further elaboration is unnecessary.

Figures 2, 3:
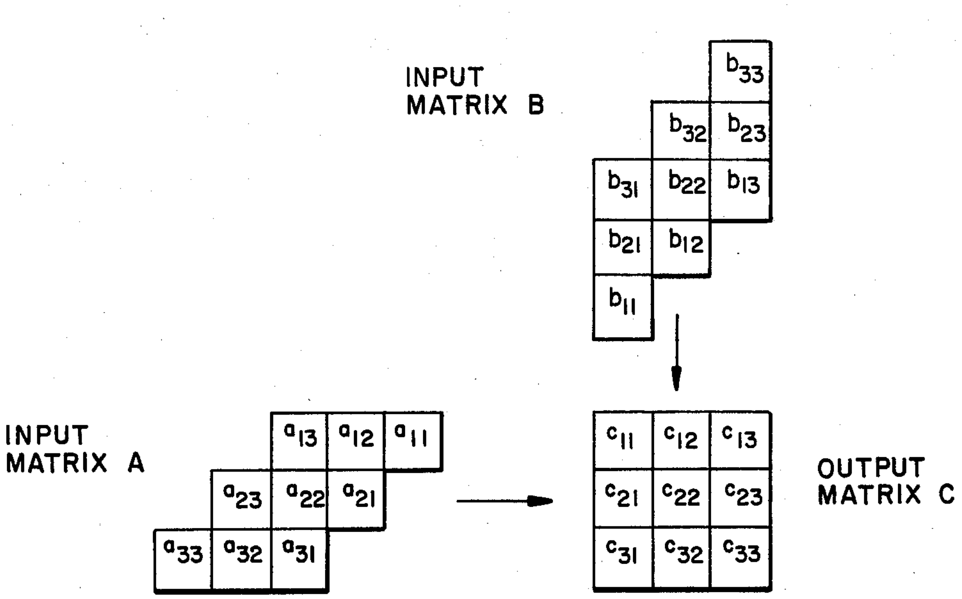
FIG. 2 shows a representastion of binary integers for the signed absolute value, the ones complement and the twos complement representation of integers.
FIG. 3 shows a symbolic representation of the multiplication of two matrices using the engagement-array format.
Figures 6, 7:
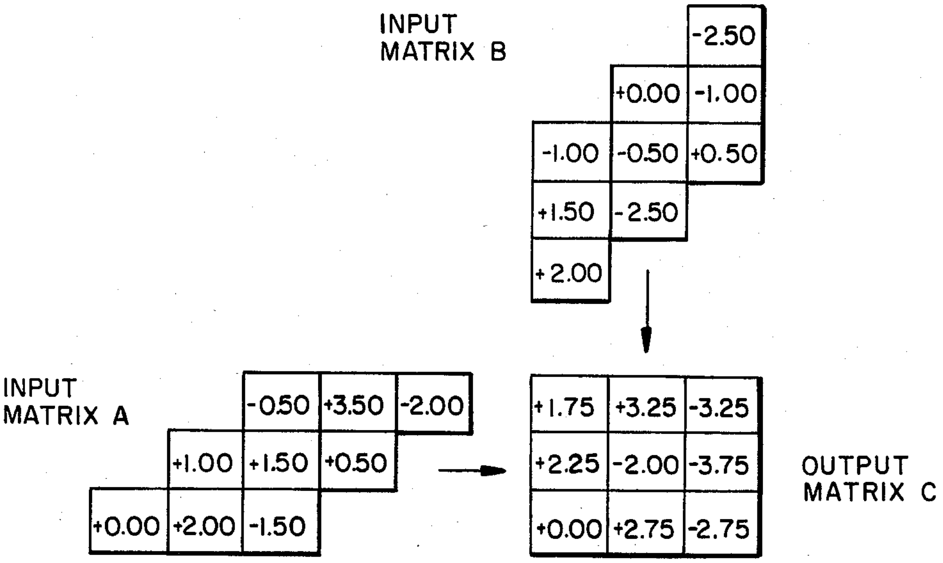
FIG. 6 depicts the numbers involved in the multiplication of two real 3×3 matrices A and B to arrive at matrix C.
FIG. 7 shows an example of an arrangement of numbers for the multiplication of two matrices using the engagement-array format (decimal representation).

The foregoing concepts are easily extended to the multiplication of two matrices using the engagement-array architecture represented in FIG. 3. The multiplication of two real decimal value 3×3 matrices A and B and its product matrix C as shown in FIG. 6 may be presented in engagement-array format as shown with the representative values in FIG. 7.

For the decimal values shown it requires, at the most, five bits including the sign bit for a complete matrix representation.

Figure 8:
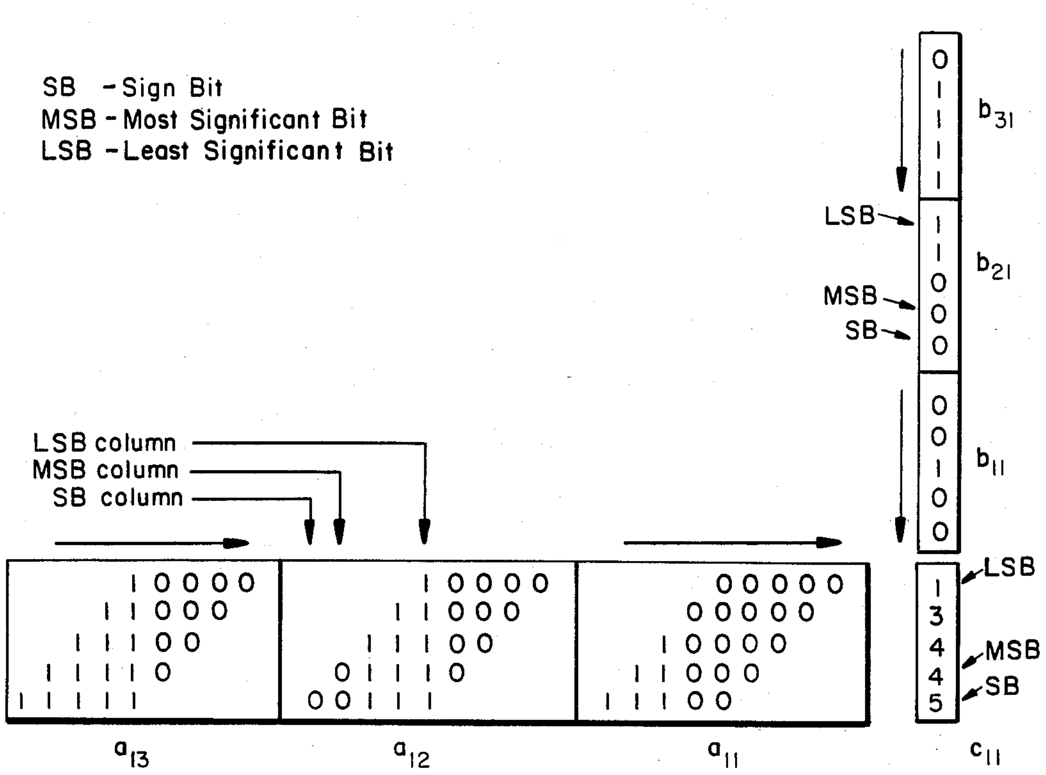
FIG. 8 is a representation of the method for encoding the input matrix element information for the first row of matrix A and the first column of matrix B using the twos complement binary representation with the first row of the matrix A information in a redundant staggered, shearing engagement array format.

Directing attention on the first row of matrix A and the first column of matrix B, the decimal numerical representations thereof are set out in FIG. 8 in a twos complement representation. This may be encoded as patterns of holes and blank places, transparency spots and opaque spots or any related alternation scheme that will convey logical ones and zeros. Since five bits are required to represent the decimal value of numbers of input matrices A and B and since five bits are required to represent the decimal value of numbers of C, this number of bits is set out in the masks in twos complement form. It should be noted that each element of the row of matrix A information requires a 5×5 staggered, sheared array of resolution cells containing zeros and ones to represent it whereas each element of matrix B information only requires a linear 5×1 array of cells. Each element in the output matrix C also requires a linear 5×1 array of cells to handle the mixed binary representation generated in the process.

Figure 9:
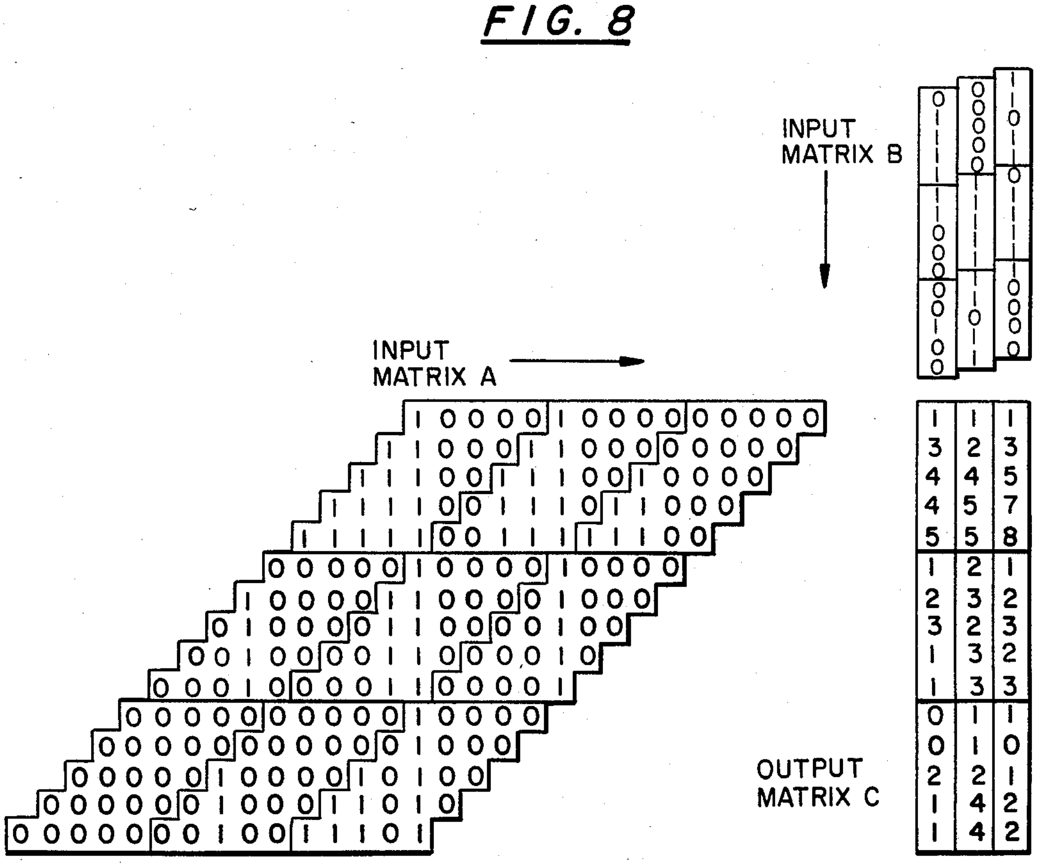
FIG. 9 is an expanded example of the multiplication of two matrices A and B having the numerical values of FIG. 6 using the engagement array format (twos complement representation).

Returning to the format in which the matrix A elements are encoded, the bottom row of each of the 5×5 sheared array contains the complete 5-bit binary representations required. All the columns or parital columns contain the same information, that is all ones or all zeros, and also the portion of the 5×5 array to the right of the least significant bit contains only zeros. It is obvious from this diagram that much of the unused space should be better utilized. The arrangement of information as shown in FIG. 9 presents a better, more space efficient utilization of the matrix coding elements to present the full information content of matrix A and matrix B. The products are shown in output matrix C in mixed binary representations.

Obviously many modifications and variations of the present invention are possible in the light of the above teachings. It is therefore to be understood that within the scope of the appended claims the invention may be practiced otherwise than as specifically described.

What is claimed is:

1. An apparatus for improving accuracy in an electro-optical matrix-matrix multiplier using twos complement arithmetic comprising:

a source of pulsed collimated light;

first means disposed to be illuminated by the pulsed collimated light source for providing a first matrix of optical encoded information of numbers in the twos complement binary representation;

second means disposed to be illuminated by the pulsed collimated light source for providing a second matrix of optical encoded information of numbers in the twos complement binary representation, the first matrix providing means and the second matrix providing means are adapted to be mutually orthogonally displaced with respect to one another to optically align different encoded information of numbers of twos complement binary representations each time the light source is pulsed to enable the multiplication thereof, the first matrix providing means and the second matrix providing means each include a reflective surface behind a two-dimension spatial light modulator stacked to advance their encoded information of numbers of twos complement binary representations mutually orthogonal with respect to each other each time the light source is pulsed;

a polarizing beam splitter located to receive pulsed collimated light from the source and orthogonally direct it to the first matrix providing means and to direct light reflected therefrom to the second matrix providing means that is orthogonally disposed with respect to the polarizing beamsplitter and to redirect light reflected from the second matrix providing means;

means disposed in an aligned relationship with the polarizing beam splitter to receive the redirected light therefrom for adding successively multiplied encoded information of numbers in the twos complement binary representation of the first matrix providing means and the second matrix providing means to be expressed as mixed binary representation signals; and means coupled to receive the mixed binary representation signals for decoding to twos complement and decimal representations.

2. An apparatus according to claim 1 in which the encoded information of each number in the twos complement binary representation of the first matrix providing means is set forth as a redundant staggered, sheared engagement array format.

3. A method of electrooptically matrix-matrix multiplying data using twos complement arithmetic comprising:

pulsing a collimated light source;

illuminating a first matrix of optical encoded information of numbers in the twos complement binary representation with light from the collimated light source;

optically aligning a second matrix of optically encoded information in the twos complement binary representation to the first matrix with respect to the pulsed collimated light source;

simultaneously illuminating the second matrix of optical encoded information of numbers in the twos complement binary representation with the light from the collimated light source that illuminated the first matrix;

mutually orthogonally displacing the first matrix with respect to the second matrix to optically align different encoded information of numbers of twos complement binary representations each time the light source is pulsed to enable the multiplication thereof;

aligning an array responsive to light for generating representative signals to receive the multiplied numbers of twos complement binary representation from the first matrix and second matrix;

locating a polarizing beam splitter to receive pulsed collimated light from the pulsed collimated source orthogonally to direct the pulsed collimated light to the first matrix and to direct light reflected therefrom to the second matrix and to redirect light reflected from the second matrix to the light responsive array;

adding successively multiplied encoded information of numbers in the twos complement binary representation of the first matrix and the second matrix to be expressed as mixed binary representation signals;

decoding the mixed binary representation signals to twos complement and decimal representations.

4. A method according to claim 3 further including:

providing a reflective surface behind a two-dimension spatial light modulator for the first and second matrix that advances their encoded information of numbers of twos complement binary representations mutually orthogonal with respect to each other each time the light source is pulsed.

5. A method according to claim 4 further including:

setting forth the encoded information of each number in the twos complementary binary representation of the first matrix as a redundant staggered, sheared engagement array format.

* * * * *